US012399725B2

(12) United States Patent
Foster, Jr. et al.

(10) Patent No.: US 12,399,725 B2
(45) Date of Patent: Aug. 26, 2025

(54) CLOUD-DELIVERED HOOKS AND HOOKING POLICIES

(71) Applicant: CrowdStrike, Inc., Sunnyvale, CA (US)

(72) Inventors: Blair C. Foster, Jr., Ottawa (CA); Eric Jay Kuhl, Halethorpe, MD (US); Garrett Moore, Ottawa (CA); Loren Robinson, Mickleton, NJ (US)

(73) Assignee: CrowdStrike, Inc., Sunnyvale, CA (US)

( * ) Notice: Subject to any disclaimer, the term of this patent is extended or adjusted under 35 U.S.C. 154(b) by 170 days.

(21) Appl. No.: 18/295,595

(22) Filed: Apr. 4, 2023

(65) Prior Publication Data

US 2024/0338228 A1   Oct. 10, 2024

(51) Int. Cl.
*G06F 9/445* (2018.01)
*G06F 8/65* (2018.01)

(52) U.S. Cl.
CPC ............ *G06F 9/44521* (2013.01); *G06F 8/65* (2013.01)

(58) Field of Classification Search
CPC ................................ G06F 8/65; G06F 9/4421
USPC .................................................. 717/120–178
See application file for complete search history.

(56) References Cited

U.S. PATENT DOCUMENTS

| 6,874,149 | B1 | 3/2005 | Bermudez et al. |
| 10,289,400 | B2 | 5/2019 | De Zaeytijd et al. |

(Continued)

FOREIGN PATENT DOCUMENTS

| WO | 00/62141 | 10/2000 |
| WO | 2015/041693 | 3/2015 |
| WO | 2016/118145 | 7/2016 |

OTHER PUBLICATIONS

Filho, Ailton Santos, Ricardo J. Rodríguez, and Eduardo L. Feitosa. "Evasion and countermeasures techniques to detect dynamic binary instrumentation frameworks." Digital Threats: Research and Practice (DTRAP) 3.2 (2022): pp. 1-28. (Year: 2022).*

(Continued)

*Primary Examiner* — Satish Rampuria
(74) *Attorney, Agent, or Firm* — Law Office of Scott P. Zimmerman, PLLC

(57) ABSTRACT

Cloud-delivered hooks are injected as binary instrumentation into a software application. The cloud-delivered hooks are specified by a cloud computing environment. The cloud-delivered hooks may be set up, and torn down, by software updates from the cloud computing environment. The cloud-delivered hooks monitor and intercept functions, APIs, and system calls in both user space and kernel space. Moreover, the cloud-delivered hooks may utilize a polymorphic universal hooking mechanism that eliminates strict signature requirements between target functions and detour functions. Because the cloud-delivered hooks are commanded by, and received from, the cloud computing environment, the cloud-delivered hooks may be easily and nearly instantaneously distributed to clients in the field for near real time software instrumentation and reporting. The cloud-delivered hooks can thus greatly simplify and quicken software development, software debugging, malware detection, and software monitoring.

19 Claims, 13 Drawing Sheets

(56) References Cited

U.S. PATENT DOCUMENTS

| 10,380,006 | B2* | 8/2019 | Hay .................. G06F 21/577 |
| 11,354,144 | B2* | 6/2022 | Dowling ............ G06F 9/45504 |
| 2005/0240906 | A1 | 10/2005 | Kinderknecht et al. |
| 2006/0282827 | A1 | 12/2006 | Yeap et al. |
| 2014/0282431 | A1* | 9/2014 | Delio, Jr. ............ G06F 11/3093 717/130 |
| 2016/0371484 | A1* | 12/2016 | Mehta .................. G06F 21/52 |
| 2019/0087210 | A1* | 3/2019 | Dowling ............ G06F 9/45508 |
| 2020/0134178 | A1* | 4/2020 | Jung ................... G06F 11/302 |
| 2020/0311268 | A1* | 10/2020 | Kostyushko ......... G06F 21/561 |
| 2021/0073015 | A1* | 3/2021 | Dowling ............ G06F 9/30174 |
| 2021/0374231 | A1 | 12/2021 | Chung et al. |

OTHER PUBLICATIONS

Yin, Heng, Zhenkai Liang, and Dawn Song. "HookFinder: Identifying and understanding malware hooking behaviors." (2008). pp. 1-17. (Year: 2008).*

Zeng, Junyuan, Yangchun Fu, and Zhiqiang Lin. "Pemu: A pin highly compatible out-of-vm dynamic binary instrumentation framework." Proceedings of the 11th ACM SIGPLAN/SIGOPS International Conference on Virtual Execution Environments. 2015. pp. 147-160. (Year: 2015).*

Botacin, Marcus, Paulo Lício De Geus, and André Grégio. "Who watches the watchmen: A security-focused review on current state-of-the-art techniques, tools, and methods for systems and binary analysis on modern platforms." ACM Computing Surveys (CSUR) 51.4 (2018): 1-34. (Year: 2018).*

Rudd, Ethan M., et al. "A survey of stealth malware attacks, mitigation measures, and steps toward autonomous open world solutions." IEEE Communications Surveys & Tutorials 19.2 (2016): 1145-1172. (Year: 2016).*

Karvandi, Mohammad Sina, et al. "Hyperdbg: Reinventing hardware-assisted debugging." Proceedings of the 2022 ACM SIGSAC Conference on Computer and Communications Security. 2022. pp. 1709-1723 (Year: 2022).*

Extended European Search report mailed Sep. 16, 2024 for European Application No. 24162949.2, 12 pages.

* cited by examiner

CLOUD-DELIVERED HOOKS AND HOOKING POLICIES

BACKGROUND

The subject matter described herein generally relates to computers and to computer software and, more particularly, the subject matter relates to operating systems and to functional hooking, for instance, for instrumenting, monitoring, and debugging software applications.

Functional hooks provide visibility of software processes and events. Software applications interact with an operating system by invoking functions. Sometimes a function produces a side effect that is externally visible (such as data logging, event tracing, or notifications). Most times, though, a function is internally hidden and produces no visible side effect. Hooking has been used to intercept functions, but functional hooks are slow and laborious to implement and require frequent version updates to software deployed in the field. Conventional hooking solutions simply do not allow for rapid identification and resolution of software bugs, malware, and other update objectives.

SUMMARY

Cloud-delivered hooks are injected as binary instruments into software applications. The cloud-delivered hooks are specified by, and may originate from, a cloud computing environment. The cloud-delivered hooks may be set up, and torn down, merely by software updates from the cloud computing environment. The cloud-delivered hooks monitor and intercept functions, Application Programming Interfaces (or APIs), or system calls in user space. Moreover, the cloud-delivered hooks may utilize a polymorphic universal hooking mechanism that eliminates strict signature requirements between target functions and detour functions. Because the cloud-delivered hooks are commanded by and sent from the cloud computing environment, the cloud-delivered hooks may be easily and nearly instantaneously distributed to clients in the field for near real time software instrumentation. The cloud-delivered hooks can thus greatly simplify and quicken software development, software debugging, malware detection, and software monitoring.

BRIEF DESCRIPTION OF THE SEVERAL VIEWS OF THE DRAWINGS

The features, aspects, and advantages of cloud services malware detection are understood when the following Detailed Description is read with reference to the accompanying drawings, wherein.

DETAILED DESCRIPTION

Figure 1:
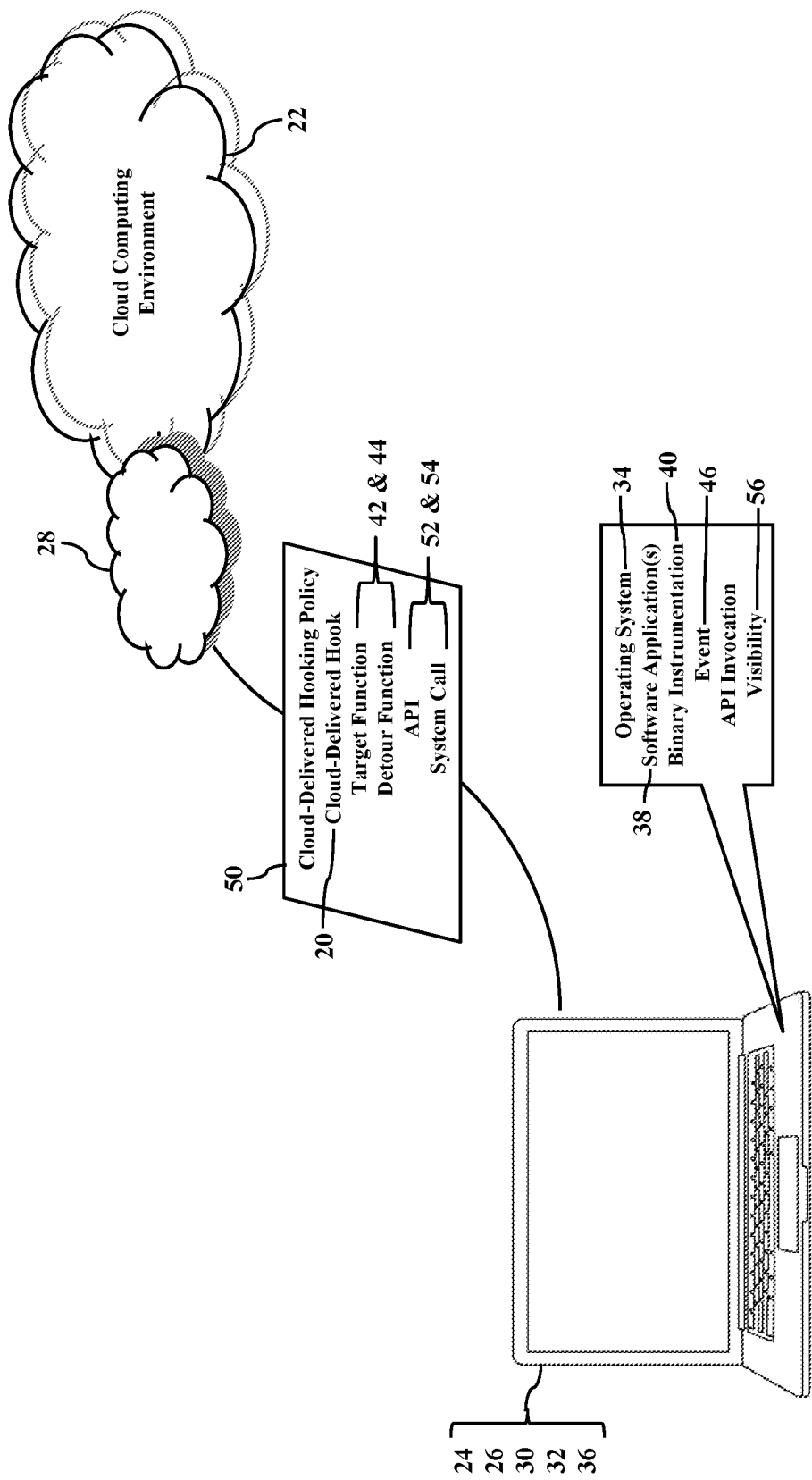
FIG. 1 illustrates examples of cloud-delivered hooks in a cloud-computing environment.

Some examples relate to hooking software applications. Cloud-delivered hooks are added to a software application to reveal its inner operations. The cloud-delivered hooks, though, are sent to a client device via the Internet. That is, the cloud-delivered hooks are specified by a cloud computing environment, and the cloud computing environment distributes the cloud-delivered hooks via the Internet to the client device. When the client device receives the cloud-delivered hooks, the client device may then insert, or inject, the cloud-delivered hooks into the software application.

The cloud-delivered hooks instrument the software application. As the client device executes the software application, the client device will encounter the cloud-delivered hooks. Each cloud-delivered hook causes the client device to intercept predefined, targeted programming (such as a particular function, Application Programming Interface (or API), and/or system call) and to, in addition to, perform a substitute or detour programming. The detour programming is intentionally added and coded, for instance, to allow instrumentation and visibility into operations. In some examples, each cloud-delivered hook thus causes the client device to output descriptions of the instrumented operations. When the cloud-delivered hook completes the substitute/detour programming, the client device returns to the software application and resumes execution.

The cloud-delivered hooks are simple and exceptionally swift to implement. The cloud-delivered hooks are specified by the cloud computing environment. The cloud-delivered hooks may be formatted according to a polymorphic hooking mechanism that ensures compatibility between the target programming and the detour programming. When the cloud computing environment specifies the cloud-delivered hook, the client device utilizes the polymorphic hooking mechanism to format the detour programming to match signature requirements imposed by the target programming. Because the cloud-delivered hooks are specified by the cloud computing environment, the cloud-delivered hooks may be distributed via the Internet to computers, servers, smartphones, appliances, and any other networked client devices. Each client device need only inject the cloud-delivered hooks to immediately instrument the software. Development, debugging, and malware exposure may immediately commence. Moreover, once the cloud-delivered hook exposes its targeted programming, the client device may report that exposure back to the cloud computing environment. Binary instrumentation is thus accomplished within minutes from hundreds or even thousands of client devices deployed in the field.

Cloud-delivered hooking will now be described more fully hereinafter with reference to the accompanying drawings. Cloud-delivered hooking, however, may be embodied in many different forms and should not be construed as limited to the examples set forth herein. These examples are provided so that this disclosure will be thorough and complete and fully convey cloud-delivered hooking services to those of ordinary skill in the art. Moreover, all the examples of cloud-delivered hooking services are intended to encompass both structural and functional equivalents thereof. Additionally, it is intended that such equivalents include both currently known equivalents as well as equivalents developed in the future (i.e., any elements developed that perform the same function, regardless of structure).

FIG. 1 illustrates examples of cloud-delivered hooks 20 in a cloud-computing environment 22. A client or endpoint computer 24 communicates with the cloud-computing environment 22 via a network interface 26 to a communications network 28. The client/endpoint computer 24 is illustrated as a laptop computer 30, but the client/endpoint computer 24 may be any processor-controlled device (as later paragraphs will explain). The client/endpoint computer 24 has a hardware processor 32 that executes an operating system 34 stored in a memory device 36. The client/endpoint computer 24 also stores software applications 38 in the memory device 36. While the client/endpoint computer 24 may store hundreds or thousands of the software applications 38, some familiar packages of the software applications 38 may include a web browser, email, word processing, spreadsheet, slide presentation, and cloud storage. Because at least some of the software applications 38 have unknown source codes, the cloud-delivered hook(s) 20 reveal inner or even hidden, obfuscated operations. The cloud-computing environment 22 delivers hosted cloud-native services, like storage, servers, and application services, via the communications network 28 (such as the Internet). Various implementations of the cloud-computing environment 22 are possible and could be used in the examples herein described.

Software instrumentation is often desired. Even though the client/endpoint computer 24 may store hundreds or thousands of the software applications 38, some of the software applications 38 have unknown or even obfuscated internal operations. Because the source code of these software applications 38 is often unknown, function and system call hooking approaches are used for binary instrumentation 40. The binary instrumentation 40, in simple words, adds or inserts extra program code to collect information. The extra program code may be added to any of the software applications 38 to monitor and to reveal internal operations. The cloud-delivered hook 20 is an example of the binary instrumentation 40. The cloud-delivered hook 20 is injected into the software application 38 to reveal its internal operations and behavior. Hooking is especially advantageous in malware identification, software testing, and software debugging. Hooking functions and system calls involves identifying a target function 42 to be intercepted at runtime and a corresponding detour function 44. The target function 42 is a function or call to be instrumented (or hooked) and monitored to reveal its operation. The detour function 44 is the extra program code that is added to the software application 38. The detour function 44 modifies the target function 42 by adding code that reveals inner behavior. So, when the software application 38 calls the target function 42, execution jumps or detours to the detour function 44. The detour function 44 executes its monitoring program code, thus revealing the behavior of the target function 42. Once the detour function 44 is completed, execution returns to the software application 38. The target function 42 is modified in cache memory (not on disk), thus enabling interception of binary functions. When the target function 42 and/or the corresponding detour function 44 is executed or determined, an occurrence of an event 46 may be alerted. The detour function 44 thus performs whatever pre-processing and post-processing is specified. Hooking may modify the user mode of the operating system 34, a run-time environment, program libraries, or the executable software application 38. These detoured changes may be prior to program execution or at run-time, and the changes guarantee that the target function 42 will be instrumented whenever called.

Conventional hooking schemes, though, are slow and laborious. Function and system call hooks are conventionally statically-defined and tied to a software release. That is, conventional hooks must be manually added for each function of interest, and these manual efforts require much time and effort. Moreover, in a production environment, conventional hooks must be distributed/downloaded as a new software release to clients in the field, thus preventing rapid response times when misbehavior or malware is detected.

FIG. 1, instead, illustrates examples of the cloud-delivered hooks 20. Each cloud-delivered hook 20 is cloud commanded according to a cloud-delivered hooking policy 50 from the cloud computing environment 22. The cloud-delivered hook 20, in other words, is created by, distributed by, and implemented by the cloud computing environment 22. The cloud-delivered hooking policy 50 defines each cloud-delivered hook 20, such as its corresponding target function 42 and detour function 44. The cloud-delivered hooking policy 50 may further specify Application Programming Interfaces (or APIs) 52 and/or system calls 54 to be hooked (via their corresponding cloud-delivered hooks 20) for additional binary instrumentation 40. Each cloud-delivered hook 20 thus provides a cloud-sourced API invocation visibility 56 into the functions 42 and 44, the APIs 52, and/or the system calls 54 specified by the cloud-delivered hooking policy 50. The cloud-delivered hooking policy 50 dynamically generates each cloud-delivered hook 20 as an endpoint detection and response (or EDR) implementation. Each cloud-delivered hook 20 may also be dynamically torn down, removed/deleted, and/or terminated according to the cloud-delivered hooking policy 50.

The binary instrumentation 40 is thus cloud commanded and cloud defined. The cloud-delivered hooking policy 50 is received from the cloud computing environment 22. The laptop computer 30 stores the cloud-delivered hooking policy 50 to the memory device 36. The laptop computer 30 determines the cloud-delivered hook 20 by reading the cloud-delivered hooking policy 50 and by identifying the cloud-delivered hook 20 specified by the cloud-delivered hooking policy 50. The cloud-delivered hooking policy 50 specifies the target function 42 and/or the detour function 44 associated with the cloud-delivered hook 20. The laptop computer 30 may then hook the software application 38 by injecting the cloud-delivered hook 20 into the programming code representing the software application 38 specified by the cloud-delivered hooking policy 50. The laptop computer 30 thus cloud hooks the target function 42 and executes the detour function 44, as instructed by the cloud-delivered hooking policy 50. Because the cloud-delivered hook(s) 20 is/are cloud commanded and cloud defined, manual hooking is entirely eliminated.

Figure 2:
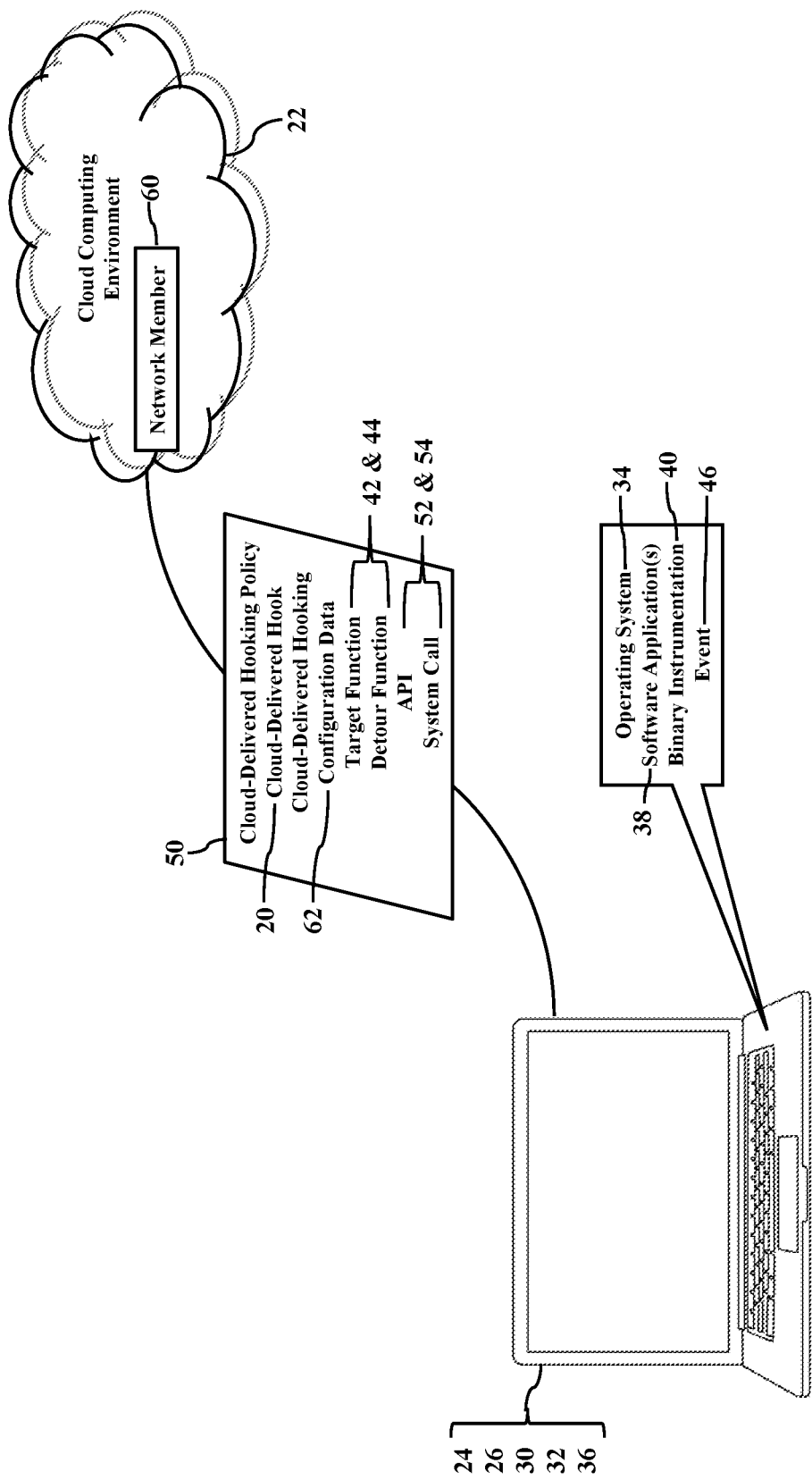
FIGS. 2-3 illustrate more examples of the cloud-delivered hooks in the cloud-computing environment.
Figure 3:
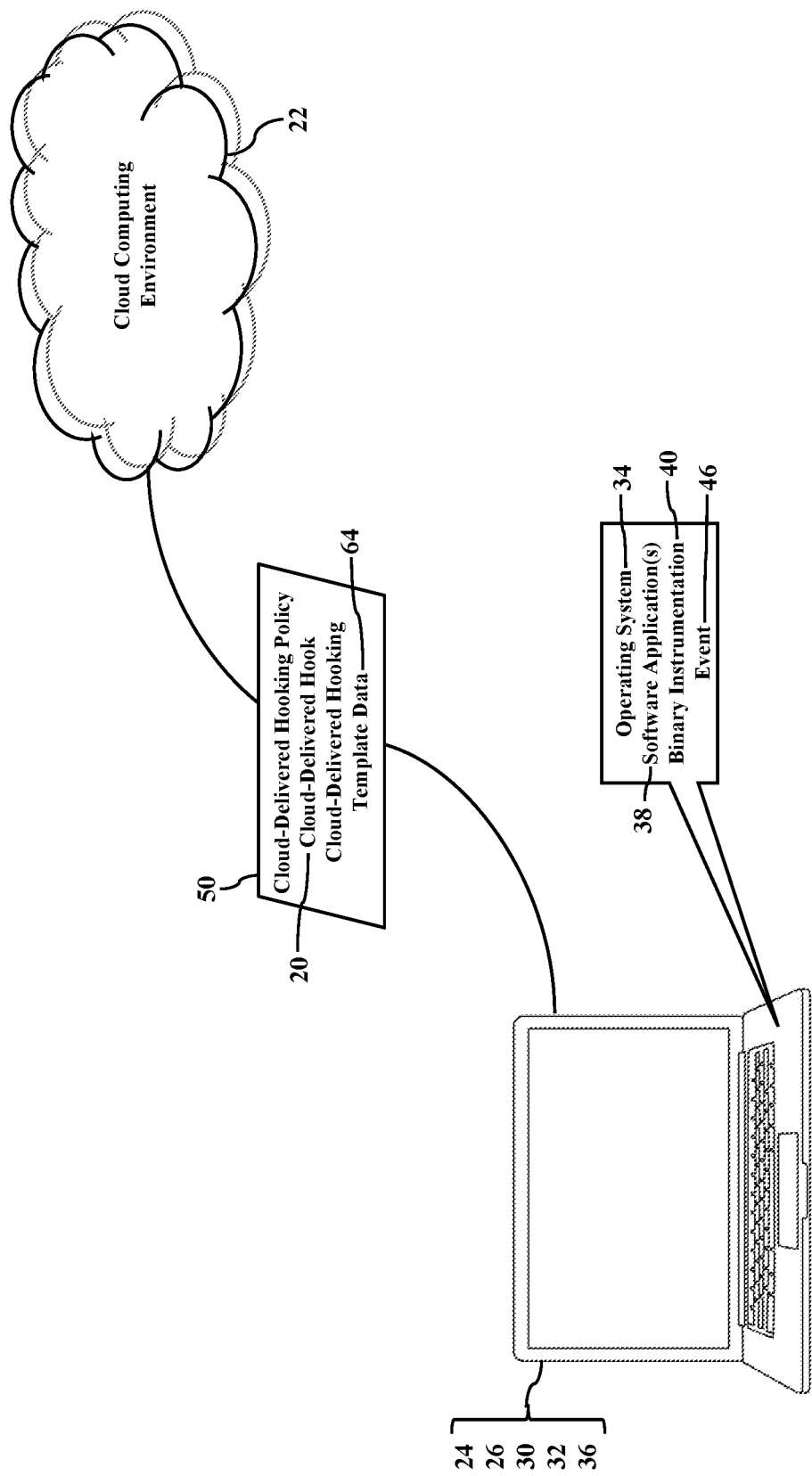

FIGS. 2-3 illustrate more examples of the cloud-delivered hooks 20 in the cloud-computing environment 22. A network member 60 (such as a server, switch, or router) affiliated with the cloud-computing environment 22 sends the cloud-delivered hooking policy 50 (via the communications network 28 illustrated in FIG. 1) to a network address (e.g., Internet Protocol address) associated with the client/endpoint computer 24. When the client/endpoint computer 24 (again illustrated as the laptop computer 30) receives the cloud-delivered hooking policy 50, the operating system 34 instructs or causes the hardware processor 32 to read the cloud-delivered hooking policy 50 and to identify detailed information associated with the cloud-delivered hook 20. The laptop computer 30, for example, may read and identify cloud-delivered hooking configuration data 62 for each corresponding cloud-delivered hook 20. The cloud-delivered hooking configuration data 62 includes at least one of code instructions, data, settings, values, policies, and/or parameters that define the corresponding cloud-delivered hook 20. The cloud-delivered hooking configuration data 62, for example, may specify the target function 42, the API(s)

52, and/or the system call(s) 54 and its corresponding detour function 44. Once the laptop computer 30 receives and determines the cloud-delivered hooking configuration data 62, the laptop computer 30 injects the cloud-delivered hook 20 as specified by the cloud-delivered hooking configuration data 62.

FIG. 3 illustrates examples of cloud-delivered hooking template data 64. When the client/endpoint computer 24 (again illustrated as the laptop computer 30) receives the cloud-delivered hooking policy 50, the operating system 34 may instruct or cause the hardware processor 32 to read the cloud-delivered hooking policy 50 and to identify the cloud-delivered hooking template data 64. The cloud-delivered hooking template data 64 specifies how the detected event 46 is handled and reported. When the event 46 (such as the target function 42, the detour function 44, the API 52, and/or the system call 54 illustrated in FIG. 1) is detected, the cloud-delivered hooking template data 64 specifies or defines how, when, and/or where the event 46 is reported. The cloud-delivered hooking template data 64, for example, may establish a reporting format that defines how the event 46 is alerted (such as an electronic message, SMS text message, log entry, or template notification) and when the event 46 is reported (e.g., immediate, near real time, periodic, etc.). The cloud-delivered hooking template data 64 may further specify a reporting IP address for any/each/all event(s) 46, thus ensuring that an instrumentation output is sent back to the cloud computing environment 22 for logging/monitoring efforts.

Figure 4:
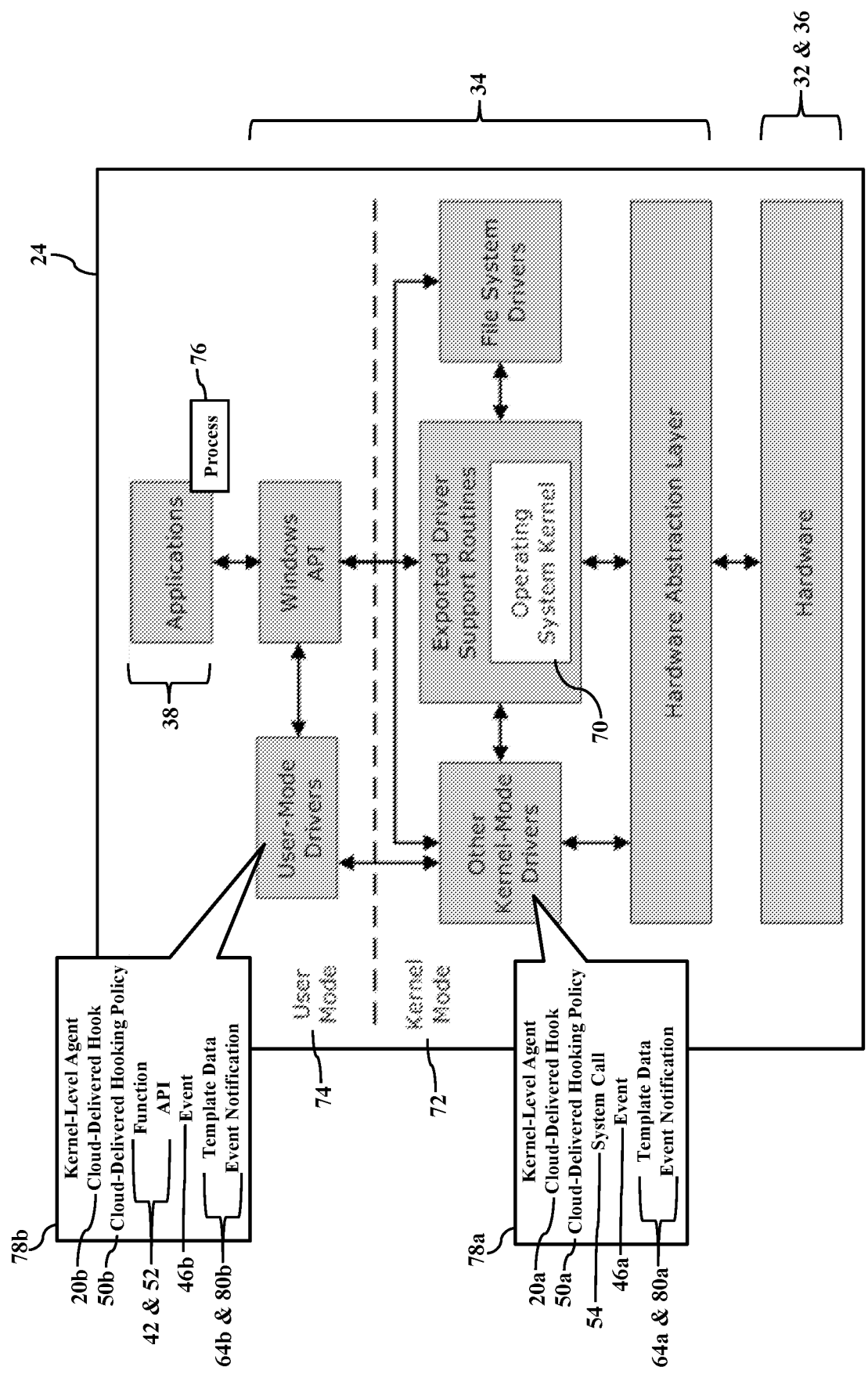
FIG. 4 illustrates kernel examples of the cloud-delivered hook.

FIG. 4 illustrates kernel examples of the cloud-delivered hook 20. The cloud-delivered hook 20 may be implemented regardless of processor mode of operation. The client/endpoint computer 24 has the hardware processor 32 that executes the operating system 34 stored in the memory device 36. A kernel 70 of the operating system 34 controls utilization and access to the hardware resources 32 and 36. The hardware processor 32 thus has a kernel mode 72 and a user mode 74, and the hardware processor 32 switches between these two modes 72 and 74 depending on what type of code is running on the hardware processor 32. The kernel 70 of the operating system 34, for example, loads and runs in the kernel mode 72 that provides a protected kernel space or portion of the memory device 36. The software applications 38 store and execute from a user space of the memory device 36 associated with the user mode 74. When any user-mode software application 38 starts, launches, or initiates (such as by a user's open tactile selection or app-to-app invocation), the operating system 34 creates a process 76 that corresponds to opening/initiating/selecting/invocating/running the software application 38. While FIG. 4 illustrates the process 76 associated with the user mode 74, the process 76 may additionally or alternatively be associated with the kernel mode 72. The kernel 70 allocates a private space in the memory device 36 that is dedicated to the process 76.

A kernel-level agent 78 interfaces with the operating system 34. The kernel-level agent 78 is a software application or program code that is stored in the memory device 36 and that is executed by the hardware processor 32. When the client/endpoint computer 24 receives the cloud-delivered hooking policy 50, the operating system 34 may send, forward, or share the cloud-delivered hooking policy 50 to/with the kernel-level agent 78. The kernel-level agent 78 may have kernel-mode components 78a having kernel permissions to the kernel mode 72. The kernel-level agent 78 may also have user-mode components 78b in the user mode 74. The kernel-level agent 78 may load before the operating system 34, perhaps very early in the boot-time of the client/endpoint computer 24. The kernel-level agent 78 may be installed in the form of a driver and may be received from the cloud computing environment 22 (illustrated in FIGS. 1-3). Because the kernel-level agent 78 may have the kernel-mode components 78a having kernel permissions to the kernel mode 72, the kernel-level agent 78 has kernel permissions to establish the cloud-delivered hook 20a that instruments/monitors/intercepts the system calls 54 in the kernel mode 72. Moreover, because the kernel-level agent 78 may also have the user-mode components 78b, the kernel-level agent 78 establishes the cloud-delivered hook 20b that instruments/monitors/intercepts the target function 42 and/or the APIs 52 in the user mode 74.

The kernel-level agent 78a-b may receive the events 46a-b that occur on the client/endpoint computer 24. Each event 46a-b may be generated in response to execution of the corresponding cloud-delivered hook 20a-b. The events 46a-b may be received from drivers, from event monitors, from threads monitoring log files or memory locations, and/or the cloud-delivered hooks 20a-b established according to the cloud-delivered hooking policy 50a-b. The cloud-delivered hooks 20a-b may be installed to, added to, or associated with the operating system 34. The cloud-delivered hooks 20a-b intercept, document, and/or alert of the events 46a-b of interest (such as messages, input/output requests, system calls, reads/writes, launches). When any event 46a-b is detected (perhaps as defined or specified by the corresponding cloud-delivered hook 20a-b and/or the cloud-delivered hooking policy 50a-b), the kernel-level agent 78a-b may generate and send an event notification 80a-b to the cloud computing environment 22, perhaps according to the cloud-delivered hooking template data 64a-b. The notification 80a-b thus alerts the cloud computing environment 22 of the event 46a-b occurring at the host client/endpoint computer 24.

Cloud-delivered hooking improves computer functioning. Because the cloud-delivered hooks 20 are generated by the cloud computing environment 22, the cloud-delivered hooking policy 50 eliminates the need for a specific manual implementation of each function of interest. The cloud-delivered hooks 20 may also be changed on-the-fly, without requiring a new version of software to be deployed. Indeed, because the cloud-delivered hooks 20 are generated by the cloud computing environment 22, different packages of the cloud-delivered hooks 20 may be auto-generated and distributed in response to particular threat observations, particular software behaviors, or particular monitoring desires. The cloud computing environment 22, likewise, may tear-down or destroy cloud-delivered hooks 20 in response to resolutions or lack of monitoring needs. The cloud-delivered hooking policy 50 allows a software developer to change visibility into the APIs 52 being used by the process 76 in the client/endpoint computer 24 in response to new information about misbehaviors and threats.

Figure 5:
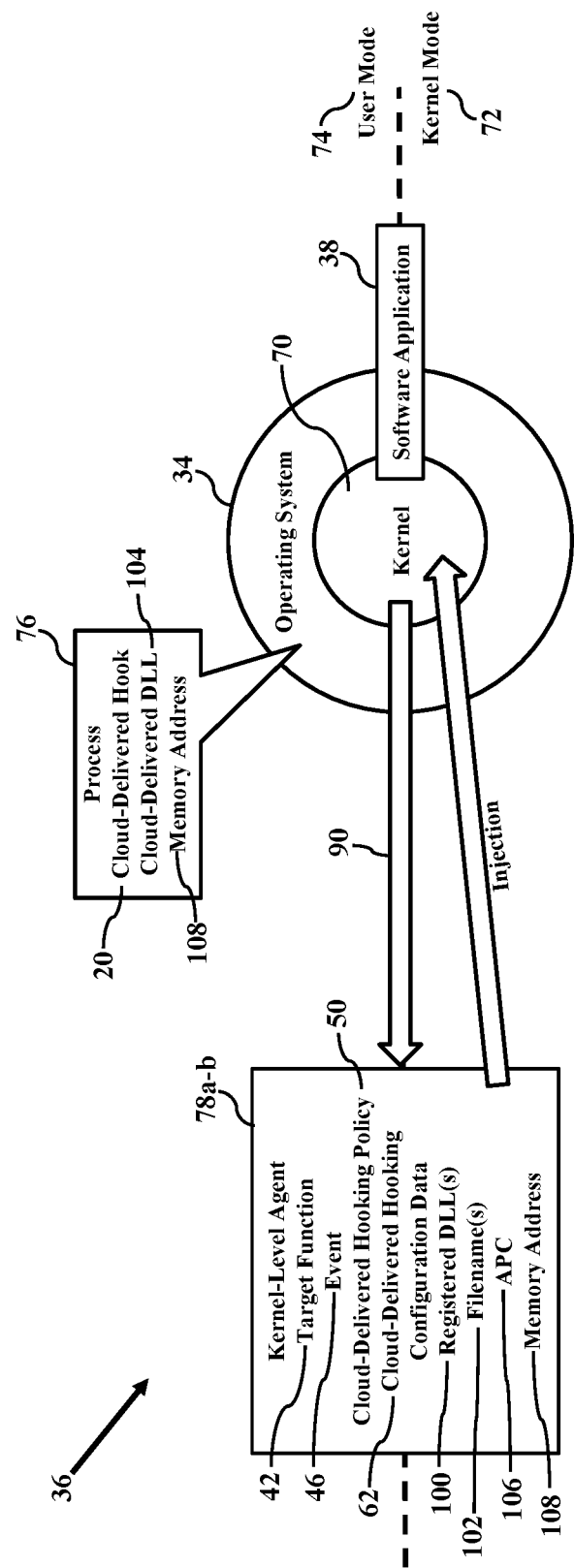
FIG. 5 illustrates examples of kernel notifications.

FIG. 5 illustrates examples of kernel notifications 90. The memory device 36 stores the operating system 34, the software application(s) 38, and the kernel-level agent 78. When any software application 38 (perhaps whether executing in the kernel mode 72 or in the user mode 74) starts/opens/launches/initiates, the operating system 34 creates the corresponding process 76 in response to opening/initiating/selecting/invocating the software application 38. When the operating system 34 and/or the kernel-level agent 78 has a cloud-delivered hooking functionality enabled, the kernel-level agent 78 registers for the kernel notification(s) 90 from the kernel 70. For example, the kernel notification 90 alerts the kernel-level agent 78 to the process 76 created by the kernel 70. While any notification scheme may be used, the kernel 70 may have a callback mechanism (such as a callback object) that informs or alerts the kernel-level agent 78 of the process 76 previously started in response to the software application 38 (e.g., creation, thread creation, handle requests, image loading, and other defined conditions). So, when the operating system 34 creates or starts the process 76, the kernel 70 may send or issue the kernel notification 90 to the kernel-level agent 78.

The kernel-level agent 78 may then inject the cloud-delivered hook 20. When the kernel-level agent 78 is alerted to the creation or start of the process 76 (such as the callback notification 90), the kernel-level agent 78 has kernel permission to inject the cloud-delivered hook 20 into the newly-created process 76 prior to execution. The kernel-level agent 78, interfacing with the operating system 34 and/or the kernel 70, identifies one or more Dynamic Link Libraries (or DLLs) 100 loaded or registered by the process 76. The kernel-level agent 78, for example, may register for DLL notifications 90 from the kernel 70 (such as another callback object) that inform the kernel-level agent 78 of each Dynamic Link Library 100 loaded/registered/specified by the process 76. The kernel-level agent 78 may then compare the loaded/registered/specified DLLs 100 to the cloud-delivered hooking configuration data 62. As a simple example, as the process 76 loads, the process 76 may notify the kernel-level agent 78 of any filename 102 (or other unique identifier) associated with the process 76. The kernel-level agent 78 may compare the DLLs/filenames 100/102 loaded or registered by the process 76 to the filenames of the cloud-delivered DLLs 104 specified by the cloud-delivered hooking configuration data 62. Should the kernel-level agent 78 determine a match between the loaded/registered DLLs/filenames 100/102 to the cloud-delivered hooking configuration data 62, the kernel-level agent 78 retrieves the corresponding cloud-delivered DLL 104 specified by the cloud-delivered hooking configuration data 62. The kernel-level agent 78 injects the cloud-delivered DLL 104 into the process 76. While the examples may utilize any injection scheme specified by any operating system, FIG. 5 illustrates Asynchronous Procedure Calls (or APCs) 106 utilized by the WINDOWS® operating system. The kernel-level agent 78 may thus invoke the APCs 106 to inject the cloud-delivered DLL 104 into the process 76. The APC 106 queue functions to threads. When a thread is scheduled, the corresponding function is run. The kernel-level agent 78 thus allocates the cloud-delivered hooking configuration data 62 in the target process 76, and a memory address 108 that points to the stored cloud-delivered hooking configuration data 62 is written to the cloud-delivered DLL 104 injected into the process 76. The cloud-delivered DLL 104 thus applies the cloud-delivered hook 20 to the corresponding target function 42 specified by the cloud-delivered hooking configuration data 62. When these hooked functions are called from this point forward, the cloud-delivered DLL 104 (injected into the process 76) gains control of execution before the target function 42 and consults the cloud-delivered hooking configuration data 62 (via a pointer to the memory address 108) to decide how to proceed. The cloud-delivered hooking configuration data 62 may specify basic filtering of the events 46 to mitigate performance issues and/or to reduce or narrow reported events of interest.

The cloud-delivered hooking configuration data 62 is external to the cloud-delivered DLL 104. Because the cloud-delivered hooking configuration data 62 is received from the cloud computing environment 22 (illustrated in FIGS. 1-3), the cloud-delivered hooking configuration data 62 is dynamic and linked to the corresponding cloud-delivered DLL 104 injected into the process 76. While the kernel-level agent 78 may allocate any portion of the memory device 36 for the cloud-delivered hooking configuration data 62, the kernel-level agent 78 may have permission to allocate a portion of the private space in the memory device 36 allocated/dedicated to the process 76. Wherever the kernel-level agent 78 writes/stores the cloud-delivered hooking configuration data 62, the kernel-level agent 78 determines the pointer to the memory address 108 to the cloud-delivered hooking configuration data 62 and writes the memory address 108 to the cloud-delivered DLL 104 injected into the process 76. When the process 76 or the operating system 34 reads or executes the injected, cloud-delivered DLL 104, the process 76 or OS 34 reads the memory address 108 that links to the cloud-delivered hooking configuration data 62 specified by the cloud computing environment 22. Because the cloud-delivered hooking configuration data 62 is external to the cloud-delivered DLL 104, the cloud-delivered hooking configuration data 62 may be dynamically and very quickly changed/updated/deleted without reloading or re-registering the cloud-delivered DLL 104. Moreover, because the cloud-delivered hooking configuration data 62 is external to the cloud-delivered DLL 104, different hooking schemes may be specified for different processes 76. The cloud-delivered hooking configuration data 62, in other words, allows different cloud-delivered hooks 20 to be invoked for different DLLs 100/104 and/or for different processes 76. A software developer may thus remotely enable and define a first set of cloud-delivered hooks 20 for a first process name (such as "chrome.exe") and also remotely enable and define a different, second set of cloud-delivered hooks 20 for a second process name ("excel.exe").

Figure 6:
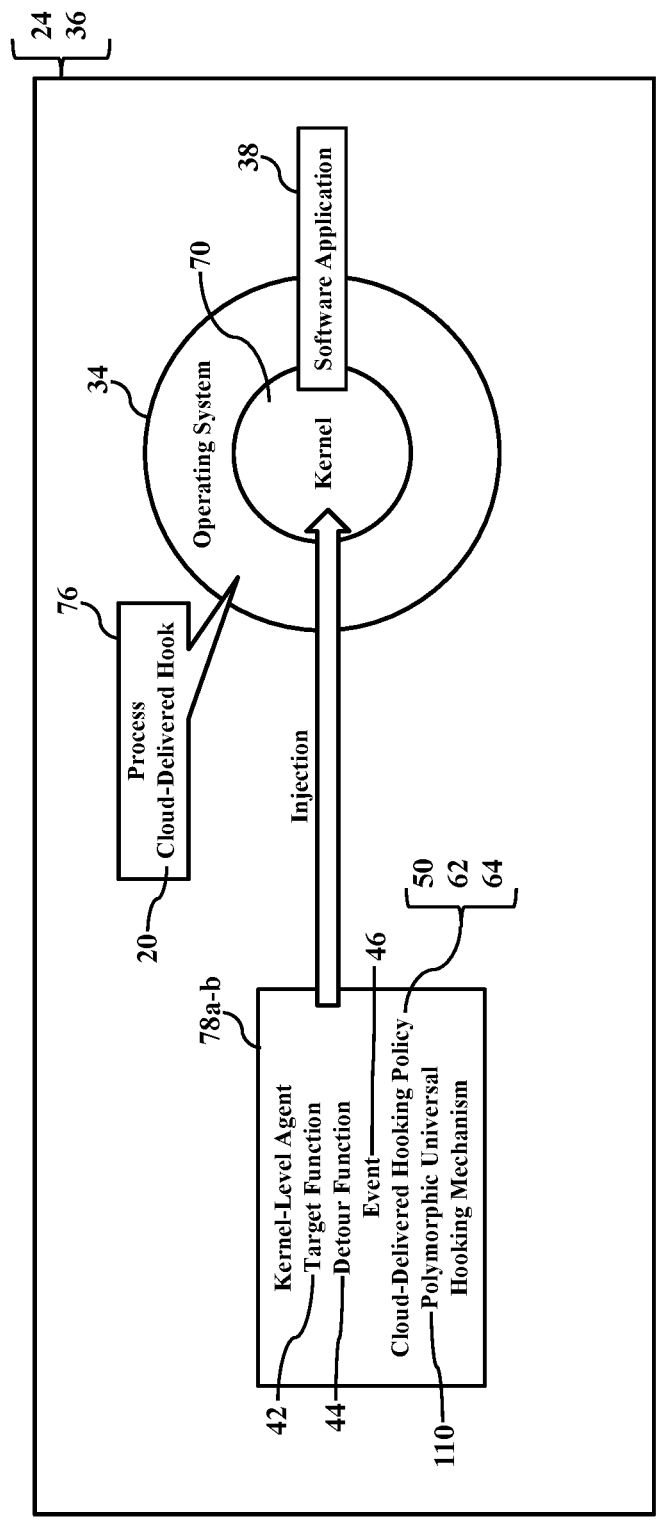
FIGS. 6-8 illustrate examples of a polymorphic universal hooking mechanism.
Figure 7:
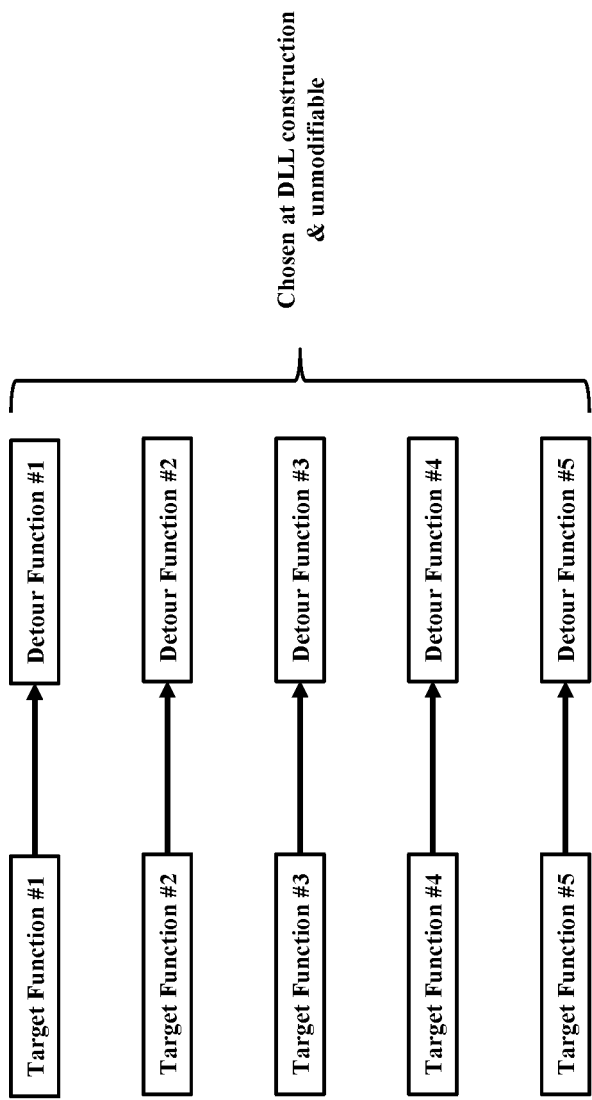
Figure 8:
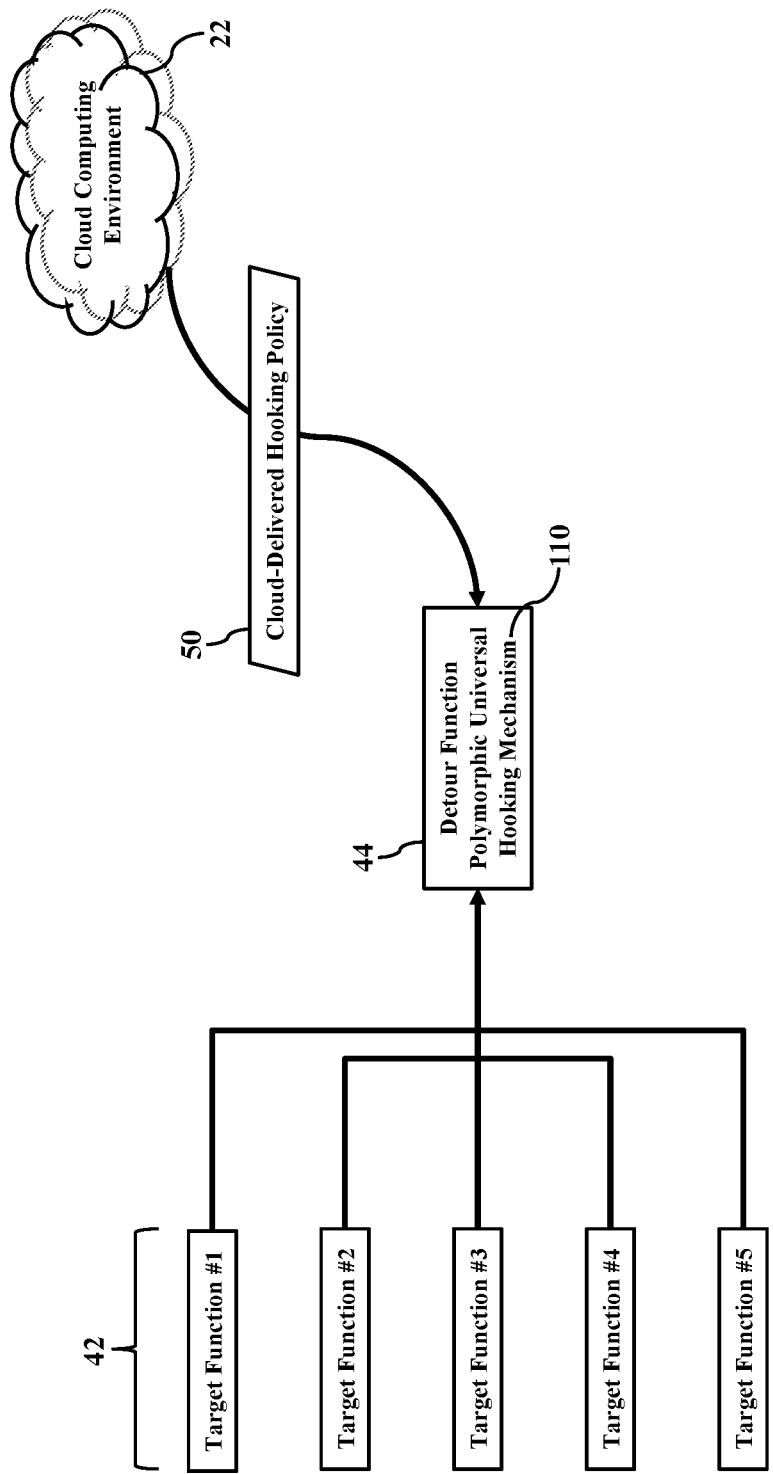

FIGS. 6-8 illustrate examples of a polymorphic universal hooking mechanism 110. The memory device 36 is illustrated within the client/endpoint computer 24. The polymorphic universal hooking mechanism 110 is defined and implemented by the cloud-delivered DLL 104. The polymorphic universal hooking mechanism 110 is a common or universal hook routine that services any number of target functions 42, regardless of the target function's specific parameters or signature. Because the cloud-delivered hooking configuration data 62 is externally stored to the cloud-delivered DLL 104 injected into the process 76 (as explained and illustrated with reference to FIG. 5), the cloud-delivered hooking configuration data 62 is automatically formatted via the polymorphic universal hooking mechanism 110 to the target function 42. The cloud computing environment 22 delivers, at any time, the cloud-delivered hooking configuration data 62 that specifies instructions for how the universal hooking mechanism 110 is applied to a single, specific target function 42 or to a plurality of target functions 42. The polymorphic universal hooking mechanism 110 thus satisfies any target/detour signature requirement, thus eliminating a one-to-one exact signature matching effort. Once the universal hooking mechanism 110 is established, the cloud computing environment 22 (illustrated in FIGS. 1-3) may dynamically instruct the host client/endpoint computer 24 to hook any specified target function(s) 42, merely by updating the cloud-delivered hooking configuration data 62. The cloud-delivered hooking configuration data 62 may dynamically increase, or decrease, the number of target functions 42 to hook.

The universal hooking mechanism 110 greatly improves computer functioning. The universal hooking mechanism 110 is polymorphic and thus adapts to any form or structure required by the target function 42. Conventional hooking procedures (such as MICROSOFT® DETOURS®) have strict signature requirements. That is, any detour function must have an exact same call signature as a target function. In practical words, this strict signature requirement means that, for every function to be hooked, a human user must provide an explicit implementation of a substitute function, which requires substantial effort and expertise. Moreover, the strict signature requirement also requires recompiling and releasing a new version of the software product which implements the conventional MICROSOFT® DETOURS® in order to change which functions are hooked. The universal hooking mechanism 110, in contradistinction, removes this strict signature requirement for an explicit matching of the target function 42 and the substitute detour function 44. The universal hooking mechanism 110 is implemented as a single function which behaves in a polymorphic manner. The universal hooking mechanism 110 may be used for all functions to be hooked, without releasing a new version of the software product. Moreover, the universal hooking mechanism 110 may be automated to generate the cloud-delivered hooks 20 in response to pre-defined threat scenarios, monitoring objectives, or debugging efforts. These packages of cloud-delivered hooks 20, in particular, may be generated by artificial intelligence (or AI) schemes that are used for automated identification of behaviors, errors, performance issues, and malware threats. The auto-generated cloud-delivered hooks 20 may then be dispersed/distributed to clients in the field for near real-time monitoring response.

FIGS. 7-8 dramatically illustrate the improved computer functioning provided by the universal hooking mechanism 110. FIG. 7 illustrates the conventional MICROSOFT® DETOURS® hooking procedure that requires a one-to-one relationship between each target function and its corresponding detour function. That is, if five (5) target functions are hooked, the conventional MICROSOFT® DETOURS® hooking procedure requires five (5) corresponding detour functions. Moreover, those one-to-one hooking relationships must be implemented and shipped in a software product. FIG. 8, in contradistinction, illustrates the universal hooking mechanism 110. Even though the same five target functions 42 are hooked, the single detour function 44 is used that implements the universal hooking mechanism 110. The universal hooking mechanism 110 thus eliminates the need for the laborious and tedious one-to-one relationship. No modification is needed to the cloud-delivered DLL 104 that runs on the targeted client or endpoint computer 24 (illustrated in FIG. 6). Instead, the cloud computing environment 22 specifies or defines (via the cloud-delivered hooking policy 50) how each target function 42 is intercepted using the universal hooking mechanism 110 to the single detour function 44. The cloud-delivered hooking policy 50 may be sent to amend or update a list of the target functions 42 to be intercepted. The number of target functions 42, at any time, may be increased or decreased, simply because all the target functions 42 point to the same, single detour function 44 using the universal hooking mechanism 110. No additional program code need be written, and no software release is required. The cloud-delivered hooking configuration data 62 modifies the target function 42 by inserting the polymorphic universal hooking mechanism 110. If any DLL 100 loaded by the process 76 matches a DLL specified by the cloud-delivered hooking configuration data 62, then the polymorphic universal hooking mechanism 110 is applied as the detour function 44 to the target function 42. The universal hooking mechanism 110 may be applied to any/all x86 and x86-64 processor architectures.

The universal hooking mechanism 110 further improves computer functioning. The conventional MICROSOFT® DETOURS® functionality is officially only applicable to a process started by the program implementing the DETOURS® functionality. The examples of the cloud-delivered hooking policy 50 utilize the MICROSOFT® DETOURS® functionality in a new and elegant manner by packaging DETOURS® into the cloud-delivered DLL 104. The cloud-delivered DLL 104 may then be novelly injected into the process 76 after start. The examples of the cloud-delivered hooking policy 50 using the universal hooking mechanism 110, in other words, do not start the process 76. The kernel-level agent 78, in contradistinction, reacts to the kernel notification of the process 76 (perhaps via the kernel notifications 90 explained with reference to FIG. 5). The universal hooking mechanism 110 thus need not be implemented or added into the software application 38 or into the process 76. The cloud-delivered hooking policy 50 thus injects the cloud-delivered DLL 104 into the process 76 in response to kernel notification 90 from the kernel 70.

The universal hooking mechanism 110 provides still more improvements to computer functioning. Conventional hooking procedures (such as MICROSOFT® DETOURS®) have strict signature requirements. That is, conventional hooking procedures implement one (1) detour function for each one (1) target function to be hooked. This one-to-one prevents hooking never-before-considered functions without releasing a new version of the DLL which uses DETOURS®. The universal hooking mechanism 110, in contradistinction, uses a single, polymorphic function specification which is a universally or commonly valid detour function 44 for any target function 42. The universal hooking mechanism 110 enables dynamic updating of the cloud-delivered hooking configuration data 62 without releasing a new version of the injected cloud-delivered DLL 104. The cloud-delivered DLL 104 (specified by the cloud-delivered hooking configuration data 62) need merely externally point or link to the remotely stored/located cloud-delivered hooking configuration data 62. The cloud-delivered hooking policy 50 is thus unrestrained and may specify any and/or every function in any module (e.g., the uploaded DLL 100) and/or in any process 76.

The cloud-delivered hooking policy 50 instruments any of the software applications 38. Once the cloud-delivered hook 20 is injected into the process 76 started in response to the software application 38, the kernel-level agent 78 may thus receive the instrumented events 46. When any cloud-delivered hook 20 is executed, the corresponding event(s) 46 is/are generated and the kernel 70 may alert the kernel-level agent 78. The event 46 logs, documents, and/or alerts of the cloud-delivered hook 20 (such as messages, input/output requests, system calls, reads/writes, launches). If the event 46 satisfies the cloud-delivered hooking template data 64 specified by the cloud-delivered hooking policy 50, then the kernel-level agent 78 may alert the cloud computing environment 22. The kernel-level agent 78 may generate and send the event notification 80 as defined by the cloud-delivered hooking policy 50. The cloud-delivered hooking template data 64, for example, specifies how the kernel-level agent 78 evaluates and reports that a specific target function 42 was called in the specific process 76. For example, the cloud-delivered hooking template data 64 may apply a specific pattern to a local process, or to cloud a detection, based on the function name associated with the target function 42 and/or a process name associated with the process 76. Both the cloud-delivered hooking configuration data 62 and the cloud-delivered hooking template data 64 are cloud-controlled and may be updated at any time. The updated data 62 and 64 will take affect for any newly launched processes 76 on a WINDOWS® system once upon receipt from the cloud computing environment 22. The cloud-delivered hooking policy 50 thus ensures that the event 46 (e.g., the instrumentation output) is reported to the cloud computing environment 22 for logging/monitoring efforts.

Figure 9:
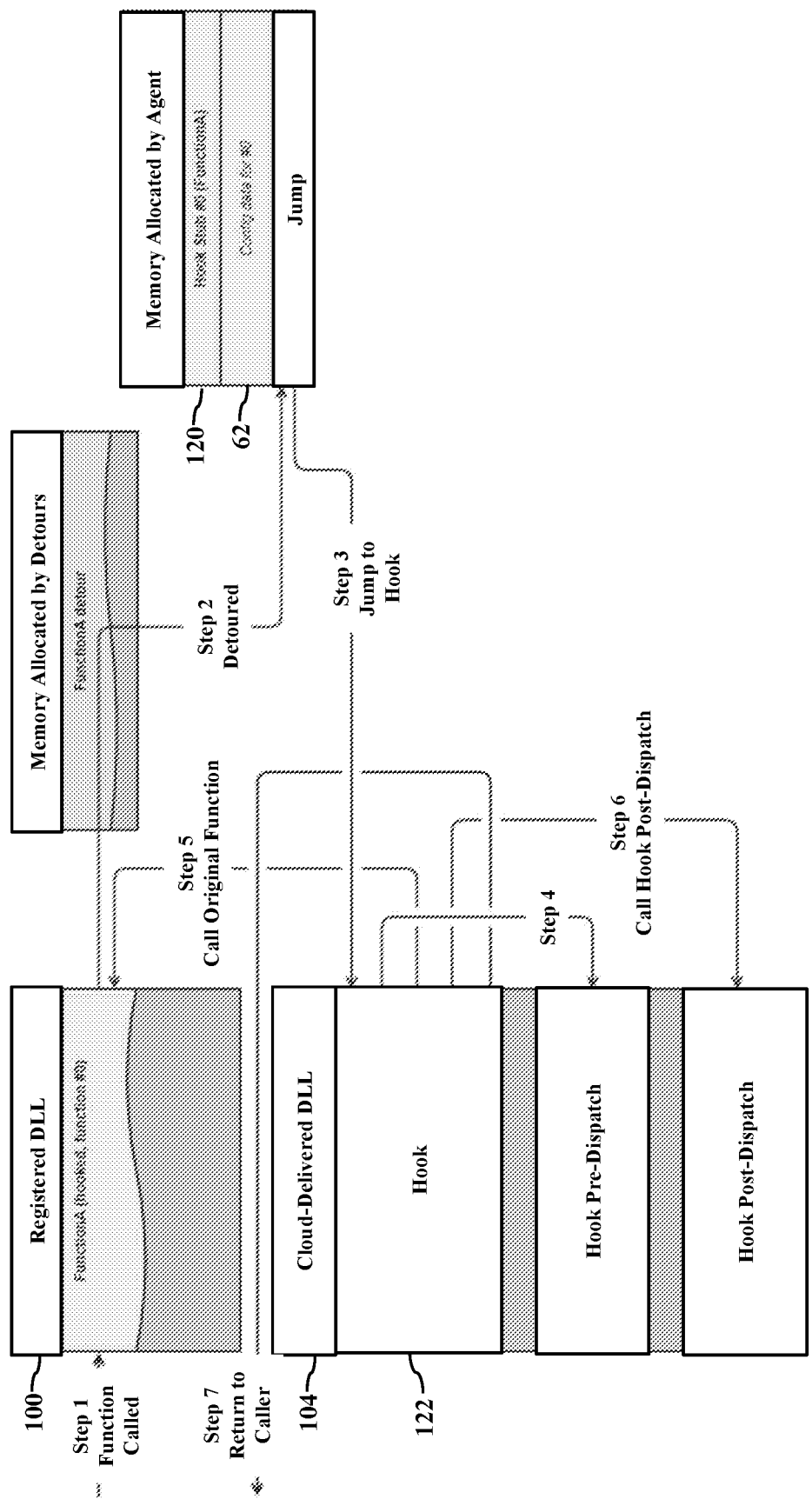
FIG. 9 illustrates examples of flow operations for cloud-delivered hooking.

FIG. 9 illustrates examples of flow operations for cloud-delivered hooking. For each cloud-delivered hook 20 specified by the cloud computing environment 22 (illustrated by FIGS. 1-3), the kernel-level agent 78 (illustrated in FIGS. 4-6) generates a corresponding hook assembly stub 120 which stores the corresponding cloud-delivered hooking configuration data 62. No matter how many different cloud-delivered hooks 20 are specified, each one of the corresponding hook assembly stubs 120 jumps to a common hook thunk 122. The common hook thunk 122 preserves all volatile registers, before calling pre- and post-dispatch functions which perform the actual "work" (such as reporting that the target function 42 was called). In the pre-dispatch function, the cloud-delivered DLL 104 (injected into the process 76) may use a thread-local storage implementation to mark the thread as processing the corresponding cloud-delivered hook 20. By marking the thread, this marking scheme prevents re-entering the dispatch functions if multiple cloud-delivered hooks 20 are invoked in a single call graph. In the post-dispatch function, this marker is cleared.

The cloud-delivered hooking policy 50 is agnostic to the operating system and to the hooking procedure. This disclosure above mostly describes the MICROSOFT® WINDOWS® operating system and the MICROSOFT® DETOURS® hooking procedure, as these products are ubiquitous and widely used in software instrumentation. In the WINDOWS® x86 and x86-64 environment, the cloud-delivered hooking policy 50 and the universal hooking mechanism 110 need only be concerned with the calling conventions used by WINDOWS® (such as cdecl, syscall, stdcall, fastcall for x86, and MICROSOFT® x64 for x86-64). On MICROSOFT® x86, there is enough common ground between each of the conventions to hook functions using any convention without interfering when the function is called. The cloud-delivered hooking policy 50, however, may be adapted to any operating system, to any hooking procedure, and to any calling convention for functions to be hooked. The cloud-delivered hooking policy 50, for example, may be adapted to any of the macOS and iOS operating systems, to any of the Android operating systems, to any of the Linux operating systems, to any of the Unix operating systems, and to any other operating system. Even though other operating systems and processor architectures may use different calling conventions, the cloud-delivered hooking policy 50 may be adapted to transparently support all potential calling conventions used on the corresponding operating system.

Figure 10:
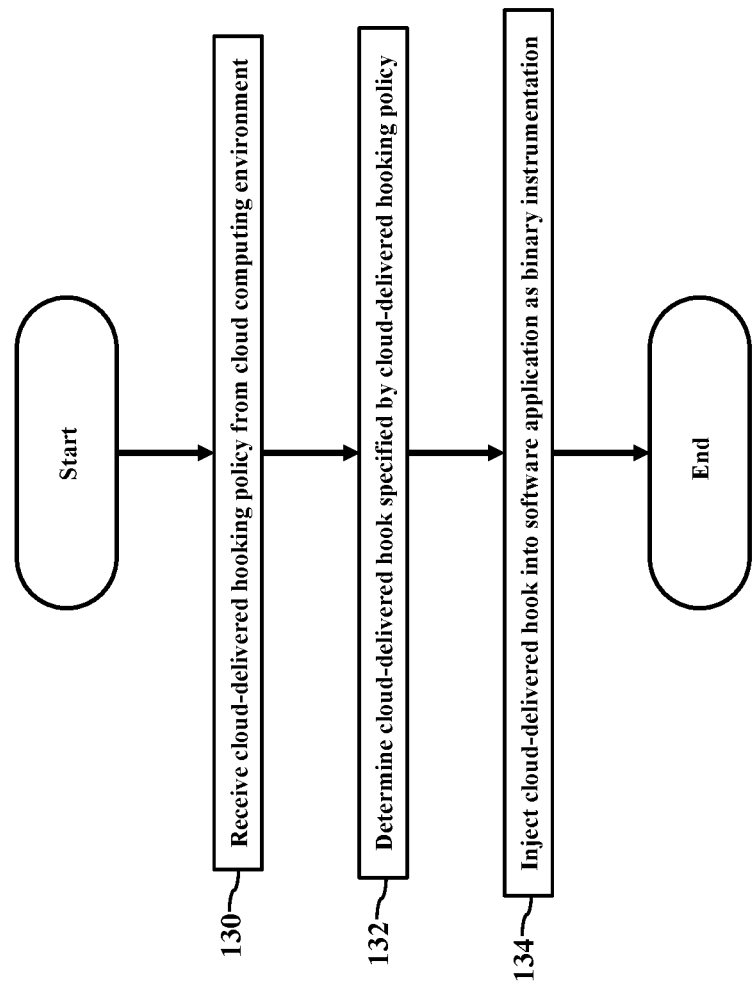
FIGS. 10-12 illustrate examples of methods for hooking software applications.

FIG. 10 illustrates an example of a method executed by the client/endpoint computer 24 that hooks the software application 38. The client/endpoint computer 24 receives the cloud-delivered hooking policy 50 from the cloud computing environment 22 (Block 130). The client/endpoint computer 24 determines the cloud-delivered hook 20 specified by the cloud-delivered hooking policy 50 (Block 132). The client/endpoint computer 24 injects or inserts the cloud-delivered hook 20 into the software application 38 as a binary instrumentation (Block 134).

Figure 11:
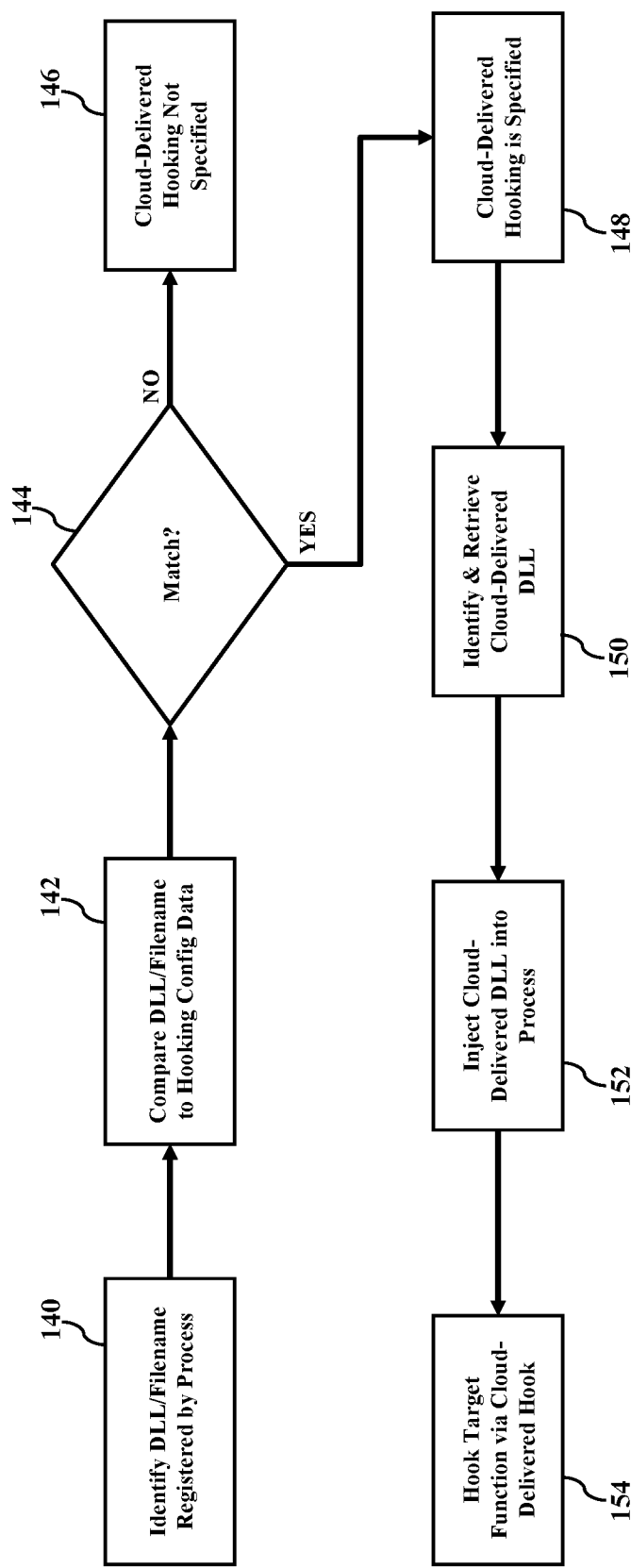

FIG. 11 illustrates another example of a method executed by the client/endpoint computer 24 for hooking the software application 38. When the client/endpoint computer 24 receives the cloud-delivered hooking policy 50, the client/endpoint computer 24 identifies the DLL/filename 100/102 registered by the process 76 associated with the software application 38 (Block 140). The client/endpoint computer 24 compares the DLL/filename 100/102 to the cloud-delivered hooking configuration data 62 specified by the cloud-delivered hooking policy 50 received from the cloud computing environment 22 (Block 142). If the DLL/filename 100/102 fails to match the cloud-delivered hooking policy 50 (Block 144), then the client/endpoint computer 24 may determine that cloud-delivered hooking is not specified for the process 76 and/or for the software application 38 (Block 146). However, if the DLL/filename 100/102 matches the cloud-delivered hooking policy 50 (Block 140), then the client/endpoint computer 24 determines that cloud-delivered hooking is specified (Block 148). The client/endpoint computer 24 identifies and retrieves the cloud-delivered Dynamic Link Library 104 specified by the cloud-delivered hooking policy 50 (Block 150). The cloud-delivered Dynamic Link Library 104 may have been included in the cloud-delivered hooking policy 50, or the cloud-delivered Dynamic Link Library 104 may be separately retrieved from the cloud computing environment 22 or some other source. However the cloud-delivered Dynamic Link Library 104 is obtained, the client/endpoint computer 24 injects the cloud-delivered Dynamic Link Library 104 into the existing process 76 started by the kernel 70 in response to launching/opening/starting of the software application 38 (Block 152). The client/endpoint computer 24 hooks the target function 42 specified by the cloud-delivered Dynamic Link Library 104 by implementing the cloud-delivered hook 20 according to the cloud-delivered hooking policy 50 (Block 154).

Figure 12:
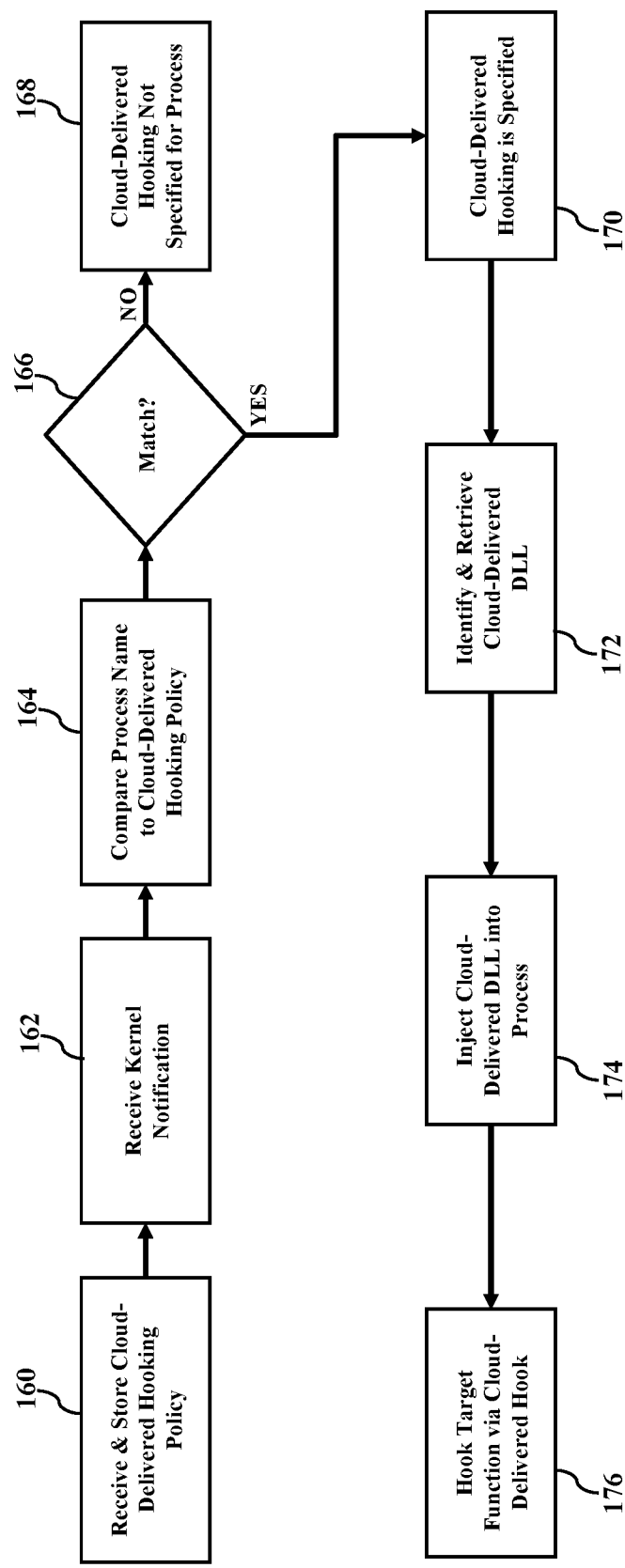

FIG. 12 illustrates another example of a method executed by the client/endpoint computer 24 for hooking the software application 38. The client/endpoint computer 24 receives and stores the cloud-delivered hooking policy 50 from the cloud computing environment 22 (Block 160). The client/endpoint computer 24 receives the kernel notification 90 sent from the kernel 70 (Block 162). The kernel notification 90 alerts of the process 76 created by the kernel 70 in response to the launching/opening/starting of the software application 38. The client/endpoint computer 24 identifies the process name associated with the process 76 and compares the process name to the cloud-delivered hooking policy 50 (Block 164). If the process name fails to match the cloud-delivered hooking policy 50 (Block 166), then the client/endpoint computer 24 determines that cloud-delivered hooking is not specified for the process 76 and/or the software application 38 (Block 168). However, if the process name matches the cloud-delivered hooking policy 50 (Block 166), then the client/endpoint computer 24 determines that cloud-delivered hooking is specified (Block 170). The client/endpoint computer 24 obtains the cloud-delivered Dynamic Link Library 104 specified by the cloud-delivered hooking policy 50 (Block 172). The cloud-delivered Dynamic Link Library 104 may have been included in the cloud-delivered hooking policy 50, or the cloud-delivered Dynamic Link Library 104 may be separately retrieved from the cloud computing environment 22 or some other source. However the cloud-delivered Dynamic Link Library 104 is obtained, the client/endpoint computer 24 injects the cloud-delivered Dynamic Link Library 104 into the existing process 76 started by the kernel 70 in response to launching/opening/starting of the software application 38 (Block 174). The client/endpoint computer 24 hooks the target function 42 specified by the cloud-delivered Dynamic Link Library 104 by implementing the cloud-delivered hook 20 according to the cloud-delivered hooking policy 50 (Block 154).

Figure 13:
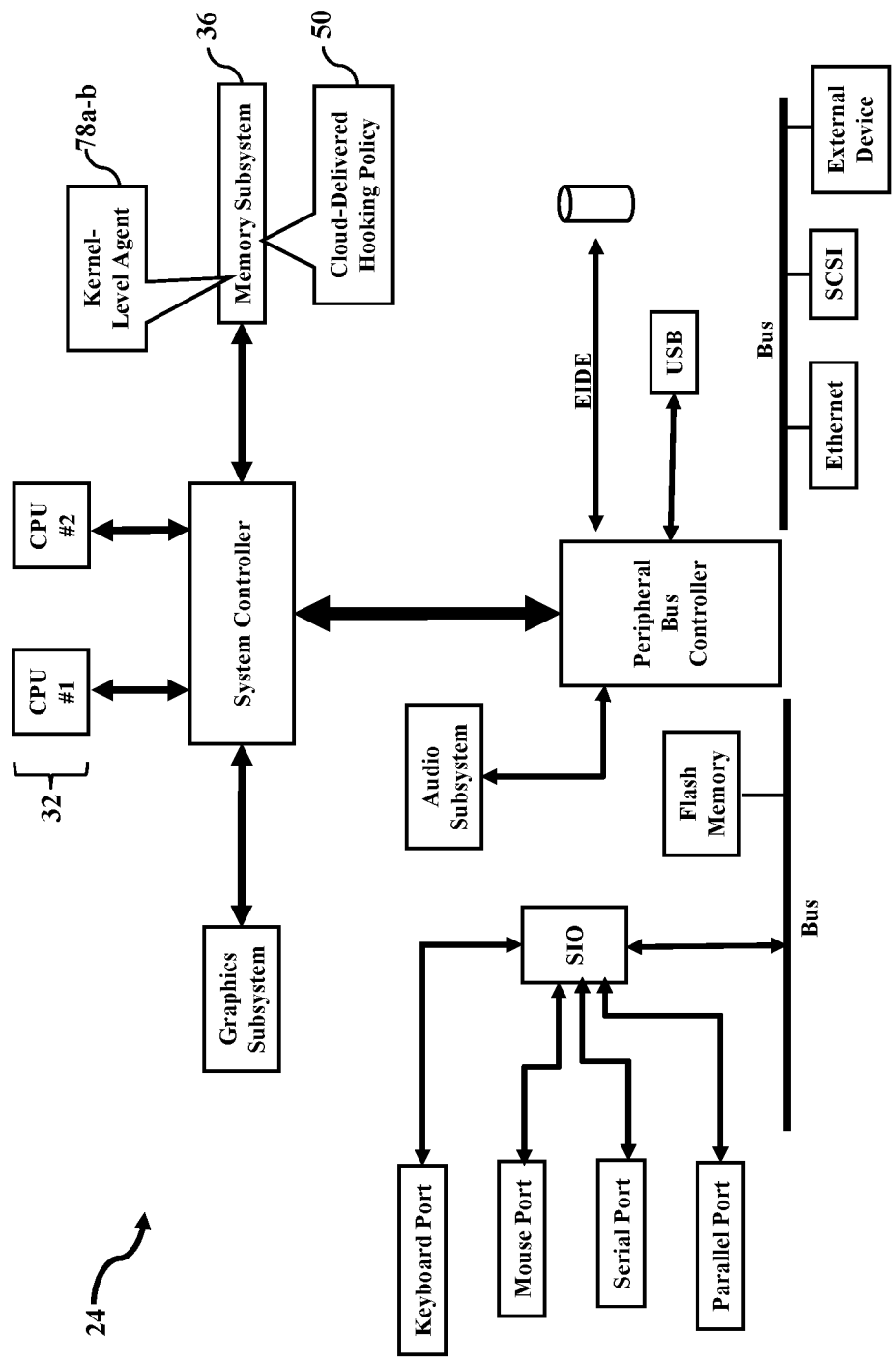
FIG. 13 illustrates a more detailed example of an operating environment.

FIG. 13 illustrates a more detailed example of the operating environment. FIG. 11 is a more detailed block diagram illustrating the client/endpoint computer 24. The kernel-level agent 78 is stored in the memory subsystem or device 36. One or more of the processors 32 communicate with the memory subsystem or device 36 and execute the kernel-level agent 78. Examples of the memory subsystem or device 36 may include Dual In-Line Memory Modules (DIMMs), Dynamic Random Access Memory (DRAM) DIMMs, Static Random Access Memory (SRAM) DIMMs, non-volatile DIMMs (NV-DIMMs), storage class memory devices, Read-Only Memory (ROM) devices, compact disks, solid-state, and any other read/write memory technology. Because the client/endpoint computer 24 is known to those of ordinary skill in the art, no detailed explanation is needed.

The client/endpoint computer 24 may have any embodiment. This disclosure mostly discusses the client/endpoint computer 24 as the laptop 30. The cloud-delivered hooking policy 50 and the kernel-level agent 78, however, may be easily adapted to other operating environments, such as a computer server, switch, router, or any other network member 60 of the cloud computing environment 22. The cloud-delivered hooking policy 50 and the kernel-level agent 78 may also be easily adapted to mobile computing, such as where the client/endpoint computer 24 may be a smartphone, a tablet computer, or a smartwatch. The cloud-delivered hooking policy 50 and the kernel-level agent 78 may also be easily adapted to other embodiments of smart devices, such as a television, an audio device, a remote control, and a recorder. The cloud-delivered hooking policy 50 and the kernel-level agent 78 may also be easily adapted to still more smart appliances, such as washers, dryers, and refrigerators. Indeed, as cars, trucks, and other vehicles grow in electronic usage and in processing power, the cloud-delivered hooking policy 50 and the kernel-level agent 78 may be easily incorporated into any vehicular controller.

The above examples of the cloud-delivered hooking policy 50 and the kernel-level agent 78 may be applied regardless of the networking environment. The cloud-delivered hooking policy 50 and the kernel-level agent 78 may be easily adapted to stationary or mobile devices having wide-area networking (e.g., 4G/LTE/5G cellular), wireless local area networking (WI-FI®), near field, and/or BLUETOOTH® capability. The cloud-delivered hooking policy 50 and the kernel-level agent 78 may be applied to stationary or mobile devices utilizing any portion of the electromagnetic spectrum and any signaling standard (such as the IEEE 802 family of standards, GSM/CDMA/TDMA or any cellular standard, and/or the ISM band). The cloud-delivered hooking policy 50 and the kernel-level agent 78, however, may be applied to any processor-controlled device operating in the radio-frequency domain and/or the Internet Protocol (IP) domain. The cloud-delivered hooking policy 50 and the kernel-level agent 78 may be applied to any processor-controlled device utilizing a distributed computing network, such as the Internet (sometimes alternatively known as the "World Wide Web"), an intranet, a local-area network (LAN), and/or a wide-area network (WAN). The cloud-delivered hooking policy 50 and the kernel-level agent 78 may be applied to any processor-controlled device utilizing power line technologies, in which signals are communicated via electrical wiring. Indeed, the many examples may be applied regardless of physical componentry, physical configuration, or communications standard(s).

The client/endpoint computer 24 may utilize any processing component, configuration, or system. For example, the cloud-delivered hooking policy 50 and the kernel-level agent 78 may be easily adapted to any desktop, mobile, or server central processing unit or chipset offered by INTEL®, ADVANCED MICRO DEVICES®, ARM®, APPLE®, TAIWAN SEMICONDUCTOR MANUFACTURING®, QUALCOMM®, or any other manufacturer. The client/endpoint computer 24 may even use multiple central processing units or chipsets, which could include distributed processors or parallel processors in a single machine or multiple machines. The central processing unit or chipset can be used in supporting a virtual processing environment. The central processing unit or chipset could include a state machine or logic controller. When any of the central processing units or chipsets execute instructions to perform "operations," this could include the central processing unit or chipset performing the operations directly and/or facilitating, directing, or cooperating with another device or component to perform the operations.

The cloud-delivered hooking policy 50 and the kernel-level agent 78 may use packetized communications. When the client/endpoint computer 24 communicates via the communications network 28, information may be collected, sent, and retrieved. The information may be formatted or generated as packets of data according to a packet protocol (such as the Internet Protocol). The packets of data contain bits or bytes of data describing the contents, or payload, of a message. A header of each packet of data may be read or inspected and contain routing information identifying an origination address and/or a destination address.

The communications network 28 may utilize any signaling standard. The cloud computing environment 22 may mostly use wired networks to interconnect the network members 60. However, the communications network 28 and the cloud computing environment 22 may utilize any communications device using the Global System for Mobile (GSM) communications signaling standard, the Time Division Multiple Access (TDMA) signaling standard, the Code Division Multiple Access (CDMA) signaling standard, the "dual-mode" GSM-ANSI Interoperability Team (GAIT) signaling standard, or any variant of the GSM/CDMA/TDMA signaling standard. The communications network 28 and the cloud computing environment 22 may also utilize other standards, such as the I.E.E.E. 802 family of standards, the Industrial, Scientific, and Medical band of the electromagnetic spectrum, BLUETOOTH®, low-power or near-field, and any other standard or value.

The cloud-delivered hooking policy 50 may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for providing the cloud-delivered hooking policy 50, as the above paragraphs explain.

The diagrams, schematics, illustrations, and the like represent conceptual views or processes illustrating examples of cloud services malware detection. The functions of the various elements shown in the figures may be provided through the use of dedicated hardware as well as hardware capable of executing instructions. The hardware, processes, methods, and/or operating systems described herein are for illustrative purposes and, thus, are not intended to be limited to any particular named manufacturer or service provider.

As used herein, the singular forms "a," "an," and "the" are intended to include the plural forms as well, unless expressly stated otherwise. It will be further understood that the terms "includes," "comprises," "including," and/or "comprising," when used in this Specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, and so on, may be used herein to describe various elements, these elements should not be limited by these terms. These terms are only used to distinguish one element from another. For example, a first computer or container could be termed a second computer or container and, similarly, a second device could be termed a first device without departing from the teachings of the disclosure.

The invention claimed is:

1. A method executed by a computer that hooks a software application, comprising:
   receiving, by the computer, a cloud-delivered hooking policy from a cloud computing environment;
   determining, by the computer, a cloud-delivered hook specified by the cloud-delivered hooking policy;
   receiving, by a kernel-level agent installed to the computer, a kernel notification notifying of a process created in response to the software application; and
   removing, by the computer, a matching requirement between a target function and a detour function associated with the cloud-delivered hook by injecting into the process a single polymorphic universal hooking mechanism as a binary instrument.

2. The method of claim 1, further comprising determining the target function specified by the cloud-delivered hooking policy.

3. The method of claim 2, further comprising hooking the target function using the single polymorphic universal hooking mechanism.

4. The method of claim 1, further comprising determining the detour function specified by the cloud-delivered hooking policy.

5. The method of claim 1, further comprising receiving an event notification from a kernel notifying of an event associated with the process created in response to the software application.

6. The method of claim 1, further comprising receiving a notification from a kernel notifying of a Dynamic Link Library.

7. A computer that hooks a software application, comprising:
   at least one central processing unit; and
   at least one memory device storing instructions that, when executed by the at least one central processing unit, perform operations, the operations comprising:
   receiving, by a kernel-level agent, a kernel notification from a kernel notifying of a process created in response to the software application;
   identifying, by the kernel-level agent, a filename registered by the process associated with the software application;
   determining, by the kernel-level agent, that the filename corresponds to a cloud-delivered Dynamic Link Library specified by a cloud-delivered hooking policy from a cloud computing environment; and
   instrumenting the process associated with the software application by injecting, by the kernel-level agent, a cloud-delivered hook specified by the cloud-delivered Dynamic Link Library.

8. The computer of claim 7, wherein the operations further comprise receiving an event notification from the kernel notifying of an event associated with the process.

9. The computer of claim 7, wherein the operations further comprise storing the cloud-delivered hooking policy to a software application dedicated portion of the memory device dedicated to the software application.

10. The computer of claim 7, wherein the operations further comprise storing the cloud-delivered hooking policy to a process dedicated portion of the memory device dedicated to the process.

11. The computer of claim 7, wherein the operations further comprise specifying a polymorphic universal hooking mechanism valid for all functions.

12. The computer of claim 7, wherein the operations further comprise removing a matching requirement between a target function and a detour function associated with the cloud-delivered hook by injecting into the process a single polymorphic universal hooking mechanism valid for all functions specified by the cloud-delivered Dynamic Link Library.

13. The computer of claim 7, wherein the operations further comprise externally storing the cloud-delivered hook from the cloud-delivered Dynamic Link Library.

14. A memory device storing instructions that, when executed by at least one central processing unit, perform operations that hook a software application, the operations comprising:
   receiving, by a kernel-level agent, a cloud-delivered hooking policy from a cloud computing environment;
   receiving, by the kernel-level agent, a kernel notification from a kernel notifying of a process created in response to the software application;
   identifying, by the kernel-level agent, a filename registered by the process associated with the software application;
   determining, by the kernel-level agent, that the filename corresponds to a cloud-delivered Dynamic Link Library specified by the cloud-delivered hooking policy from the cloud computing environment; and
   instrumenting the process associated with the software application by injecting, by the kernel-level agent, a cloud-delivered hook specified by the cloud-delivered Dynamic Link Library.

15. The memory device of claim 14, wherein the operations further comprise receiving an event notification from the kernel notifying of the process associated with the software application.

16. The memory device of claim 14, wherein the operations further comprise storing the cloud-delivered hooking policy to a software application dedicated portion of the memory device dedicated to the software application.

17. The memory device of claim 14, wherein the operations further comprise storing the cloud-delivered hooking policy to a process dedicated portion of the memory device dedicated to the process associated with the software application.

18. The memory device of claim 14, wherein the operations further comprise specifying a polymorphic universal hooking mechanism valid for a function.

19. The memory device of claim 14, wherein the operations further comprise removing a matching requirement between a target function and a detour function associated with the cloud-delivered hook by injecting into the process a single polymorphic universal hooking mechanism valid for all functions specified by the cloud-delivered Dynamic Link Library.

* * * * *